(12) United States Patent
Lee et al.

(10) Patent No.: US 10,686,248 B2
(45) Date of Patent: Jun. 16, 2020

(54) WIRELESS COMMUNICATION DEVICE

(71) Applicant: ASUSTeK COMPUTER INC., Taipei (TW)

(72) Inventors: Cheng-Tse Lee, Taipei (TW); Yi-Ting Hsieh, Taipei (TW); Saou-Wen Su, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 185 days.

(21) Appl. No.: 15/665,612

(22) Filed: Aug. 1, 2017

(65) Prior Publication Data
US 2018/0053988 A1     Feb. 22, 2018

(30) Foreign Application Priority Data

Aug. 17, 2016   (TW) ............................. 105126295 A

(51) Int. Cl.
*H01Q 1/24*   (2006.01)
*H01Q 1/27*   (2006.01)
(Continued)

(52) U.S. Cl.
CPC ............. *H01Q 1/243* (2013.01); *G04G 17/04* (2013.01); *G04G 17/06* (2013.01); *G04G 17/08* (2013.01);
(Continued)

(58) Field of Classification Search
CPC .......... H01Q 1/243; H01Q 1/48; H01Q 11/14; H01Q 7/005; H01Q 9/42; H01Q 7/00;
(Continued)

(56) References Cited

U.S. PATENT DOCUMENTS 5,973,650 A    10/1999  Nakanishi
7,369,879 B1 *  5/2008  Steigerwald ........... H01Q 1/521
                                                343/851
(Continued)

FOREIGN PATENT DOCUMENTS

CN     203288746 U    11/2013
CN     105487373 A     4/2016
(Continued)

OTHER PUBLICATIONS

Office Action issued in corresponding Taiwan patent application dated Feb. 23, 2018.

*Primary Examiner* — Vivek Srivastava
*Assistant Examiner* — Binod J Kunwar
(74) *Attorney, Agent, or Firm* — McClure, Qualey & Rodack, LLP.

(57) ABSTRACT

A wireless communication device is provided. The wireless communication device comprises a circuit board and a loop antenna. The circuit board includes a wireless communication circuit. The wireless communication circuit includes a signal transmitting end and a ground terminal. The loop antenna includes a conductive loop, a feed portion, a first short-circuit portion and a second short-circuit portion. The feed portion is connected between the conductive loop and the signal transmitting end. The first short-circuit portion and the second short-circuit portion are connected between the conductive loop and the ground terminal, respectively.

8 Claims, 8 Drawing Sheets

(51) Int. Cl.
*H01Q 7/00* (2006.01)
*H01Q 1/48* (2006.01)
*G04G 21/04* (2013.01)
*G04G 17/04* (2006.01)
*G04G 17/06* (2006.01)
*H04W 4/80* (2018.01)
*G04G 17/08* (2006.01)
*G04G 21/02* (2010.01)
*G04G 21/08* (2010.01)
*G06F 1/16* (2006.01)
*G06F 3/0354* (2013.01)
*G06F 3/041* (2006.01)
*H01Q 11/14* (2006.01)
*H04M 1/725* (2006.01)
*H01Q 9/42* (2006.01)
*G06Q 10/10* (2012.01)
*G06Q 50/00* (2012.01)

(52) U.S. Cl.
CPC ........... *G04G 21/025* (2013.01); *G04G 21/04* (2013.01); *G04G 21/08* (2013.01); *G06F 1/163* (2013.01); *G06F 1/1698* (2013.01); *G06F 3/03547* (2013.01); *G06F 3/041* (2013.01); *H01Q 1/273* (2013.01); *H01Q 1/48* (2013.01); *H01Q 7/00* (2013.01); *H01Q 7/005* (2013.01); *H01Q 11/14* (2013.01); *H04M 1/7253* (2013.01); *H04W 4/80* (2018.02); *G06F 2203/0339* (2013.01); *G06Q 10/109* (2013.01); *G06Q 50/01* (2013.01); *H01Q 9/42* (2013.01); *H04M 2250/12* (2013.01)

(58) Field of Classification Search
CPC ....... H01Q 1/273; H01Q 1/44; H04M 1/7253; H04M 2250/12; H04W 4/008; H04W 4/80; G06Q 10/109; G06Q 50/01; G04G 17/04; G04G 17/06; G04G 17/08; G04G 21/025; G04G 21/04; G04G 21/08; G06F 1/163; G06F 1/1698; G06F 1/1635; G06F 1/1675; G06F 3/03547; G06F 3/041; G06F 2203/0339
USPC ......... 709/219; 343/842, 843, 845, 859, 731
See application file for complete search history.

(56) References Cited

U.S. PATENT DOCUMENTS

| | | | | |
|---|---|---|---|---|
| 8,749,438 | B2* | 6/2014 | Jenwatanavet | H01Q 1/085 343/700 MS |
| 9,350,069 | B2* | 5/2016 | Pascolini | H01Q 5/357 |
| 2004/0171404 | A1* | 9/2004 | Annamaa | H01Q 1/243 455/550.1 |
| 2008/0252536 | A1* | 10/2008 | Anguera | H01Q 1/243 343/702 |
| 2009/0102726 | A1* | 4/2009 | Imano | H01Q 1/242 343/702 |
| 2012/0009983 | A1* | 1/2012 | Mow | H01Q 7/005 455/575.7 |
| 2012/0076184 | A1* | 3/2012 | Tran | H01Q 1/085 375/222 |
| 2013/0050046 | A1* | 2/2013 | Jarvis | H01Q 1/243 343/852 |
| 2013/0050050 | A1* | 2/2013 | Zhu | H01Q 1/2283 343/866 |
| 2013/0201067 | A1* | 8/2013 | Hu | H01Q 1/243 343/745 |
| 2013/0307732 | A1* | 11/2013 | Chiu | H01Q 5/364 343/700 MS |
| 2014/0049443 | A1* | 2/2014 | Katz | H01Q 1/273 343/871 |
| 2014/0087674 | A1 | 3/2014 | Teng et al. | |
| 2014/0159989 | A1* | 6/2014 | Malek | H01Q 1/243 343/876 |
| 2014/0306857 | A1* | 10/2014 | Bevelacqua | H01Q 1/243 343/750 |
| 2014/0333495 | A1* | 11/2014 | Vazquez | H01Q 9/06 343/745 |
| 2015/0091764 | A1* | 4/2015 | Hsieh | H01Q 5/364 343/702 |
| 2015/0249292 | A1* | 9/2015 | Ouyang | H01Q 21/30 343/702 |
| 2015/0311594 | A1* | 10/2015 | Zhu | H01Q 13/10 343/702 |
| 2016/0028148 | A1* | 1/2016 | Tan | H01Q 1/48 343/702 |
| 2018/0069317 | A1* | 3/2018 | Ayala Vazquez | H01Q 13/103 |
| 2018/0090817 | A1* | 3/2018 | Rajagopalan | H01Q 1/243 |

FOREIGN PATENT DOCUMENTS

| | | |
|---|---|---|
| TW | 201112497 A | 4/2011 |
| TW | 201338263 A | 9/2013 |
| TW | 201414075 A | 4/2014 |
| TW | 201514663 A | 4/2015 |
| TW | 201537831 A | 10/2015 |

* cited by examiner

WIRELESS COMMUNICATION DEVICE

CROSS-REFERENCE TO RELATED APPLICATION

This application claims the priority benefit of Taiwan application serial No. 105126295, filed on Aug. 17, 2016. The entirety of the above-mentioned patent application is hereby incorporated by references herein and made a part of specification.

BACKGROUND OF THE INVENTION

Field of the Invention

The disclosure relates to a wireless communication device and, more specifically, to a wireless communication device with a loop antenna.

Description of the Related Art

With the development of wireless communication technology, many wireless communication devices, such as smart phones, notebook computers, and smart watches, become popular in the market. Usually, a built-in antenna is configured to the wireless communication device to replace a conventional exposed antenna. Thus, the wireless communication quality of the wireless communication device is better, and the appearance of the wireless communication device is compact and beautiful. However, in recent years, a metal casing or housing is usually used in the wireless communication device for a better appearance, which affects the communication quality of the built-in antennas.

BRIEF SUMMARY OF THE INVENTION

According to an aspect of the disclosure, a wireless communication device is provided. The wireless communication device comprises: a circuit board including a wireless communication circuit, and a loop antenna including a conductive loop, a feed portion, a first short-circuit portion and a second short-circuit portion. The wireless communication circuit includes a signal transmitting end and a ground terminal. The feed portion is connected between the conductive loop and the signal transmitting end. The first short-circuit portion and the second short-circuit portion are connected between the conductive loop and the ground terminal, respectively. A distance between the first short-circuit portion and the feed portion is within 0.1 times of a wavelength corresponding to an operating frequency of the loop antenna. The distance between the second short-circuit portion and the feed portion is within 0.5 times of the wavelength corresponding to the operating frequency of the loop antenna.

In sum, the conductive portion of the casing of the wireless communication device is used as the antenna, which improves the utilization efficiency of the interior space of the casing. Furthermore, no additional antenna is required, which reduces the cost.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. The components shown in figures are not used for limit the size or the proportion.

Figure 1:
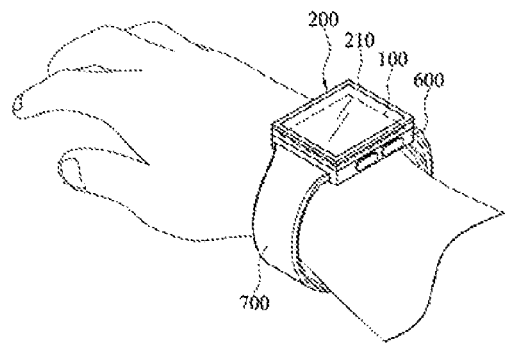
FIG. 1 is a perspective view of a wireless communication device in an embodiment.

FIG. 1 is a perspective view of a wireless communication device in an embodiment. In an embodiment, a wireless communication device is a smart watch. In embodiments, the wireless communication device is an electronic device with a wireless communication function, such as, a mobile phone, a digital multimedia player, and a remote control. In the embodiment, the wireless communication device includes a circuit board 100, a loop antenna 200 and a casing 600. The circuit board 100 is disposed inside the casing 600. The loop antenna 200 is a part of the casing 600.

Figure 2:
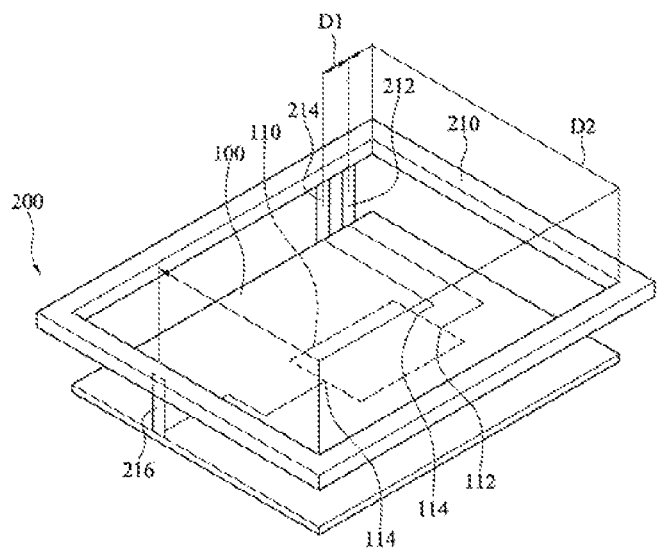
FIG. 2 is a perspective view of a circuit board and a loop antenna in an embodiment.

FIG. 2 is a perspective view of a circuit board 100 and a loop antenna 200 in an embodiment. Please refer to FIG. 2. The circuit board 100 includes a wireless communication circuit 110. The wireless communication circuit 110 includes a signal transmitting end 112 and a ground terminal 114. Wireless communication signals are generated by the wireless communication circuit 110. The wireless communication signals are sent to the loop antenna 200 via the signal transmitting end 112 and the ground terminal 114. Then, the wireless communication signals are radiated via the loop antenna 200. Inversely, external wireless signals are received via the loop antenna 200 and sent to the wireless communication circuit 110 via the signal transmitting end 112 and ground terminal 114. In an embodiment, the ground terminal 114 is connected to a ground plane (not shown) of the circuit board 100.

As shown in FIG. 2, the loop antenna 200 includes a conductive loop 210, a feed portion 212, a first short-circuit portion 214 and a second short-circuit portion 216. An end of the feed portion 212 is connected to the conductive loop 210. Another end of the feed portion 212 is connected to the signal transmitting end 112. That is, the feed portion 212 is connected between the conductive loop 210 and the signal transmitting end 112. The first short-circuit portion 214 and the second short-circuit portion 216 are connected between the conductive loop 210 and the ground terminal 114. That is, an end of the first short-circuit portion 214 is connected to the conductive loop 210. Another end of the first short-circuit portion 214 is connected to the ground terminal 114. Similarly, an end of the second short-circuit portion 216 is connected to the conductive loop 210. Another end of the second short-circuit portion 216 is connected to the ground terminal 114. The feed portion 212, the first short-circuit portion 214 and the second short-circuit portion 216 are spring sheets, or pogo pin connectors, which is not limited herein. The distance between the first short-circuit portion 214 and the feed portion 212 is within 0.1 times of a wavelength (i.e., a distance D1) corresponding to an operating frequency of the loop antenna 200. The distance between the second short-circuit portion 216 and the feed portion 212 is within 0.5 times of the wavelength (i.e., a distance D2) corresponding to the operating frequency of the loop antenna 200. The current flows from the feed portion 212, through part of the conductive loop 210 to the second short-circuit portion 216 to form a current path. Then, the current flows back to the wireless communication circuit 110 via the ground terminal 114. The length of the current path is adjusted by changing the position of the second short-circuit portion 216 to change the operating frequency of the loop antenna 200. On the other hand, an impedance matching of the loop antenna 200 is adjusted by changing the position of the first short-circuit portion 214. In the embodiment, the distances D1 and D2 are adjusted according to a communication protocol (such as Bluetooth, Wi-Fi, GPS and so on) used in the wireless communication device to make the operating frequency of the loop antenna 200 meet the requirements of the communication protocol. In the embodiment, the conductive loop 210 is a part of the casing 600. The conductive loop 210 of the casing 600 serves as the antenna. With such a configuration, no additional antenna is required to be configured inside the casing 600, which improves the utilization efficiency of the interior space. Furthermore, since the antenna is not configured inside the casing 600, the communication quality of the antenna from the metal casing 600 is not affected.

As shown in FIG. 2, a vertical projection of the conductive loop 210 is located outside the vertical projection of the circuit board 100. The vertical projections of the conductive loop 210 and the circuit board 100 are not overlapped, which reduces the signal interference to the conductive loop 210 due to components on the circuit board 100.

As shown in FIG. 2, the conductive loop 210 and the circuit board 100 are located in different (horizontal) planes. The conductive loop 210 and the circuit board 100 are not overlapped in the horizontal direction, which reduces the signal interference to the conductive loop 210 due to the components on the circuit board 100.

Figure 3:
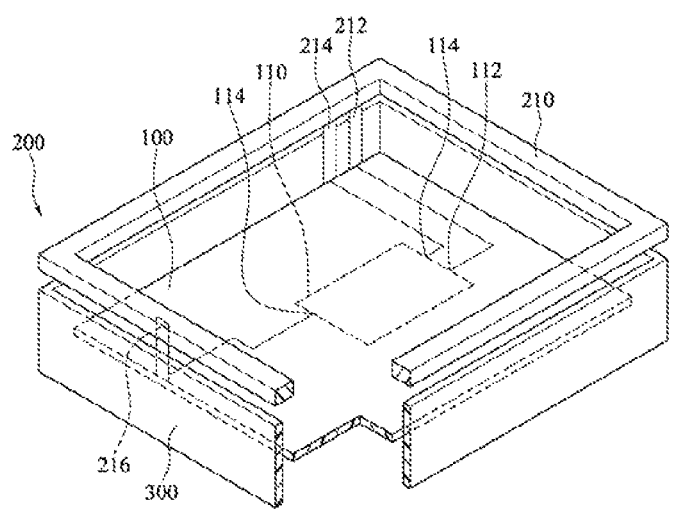
FIG. 3 is a perspective view of a circuit board and a loop antenna in an embodiment.

FIG. 3 is a perspective view of a circuit board 100 and a loop antenna 200 in an embodiment. As shown in FIG. 3, compared with the embodiment in FIG. 2, the wireless communication device further includes a ground loop 300. The ground loop 300 is disposed around the circuit board 100. The conductive loop 210 is disposed above the ground loop 300. In an embodiment, the ground loop 300 is a conductive portion of the casing 600. The conductive portion is made of metal or other conductive materials.

Figure 4:
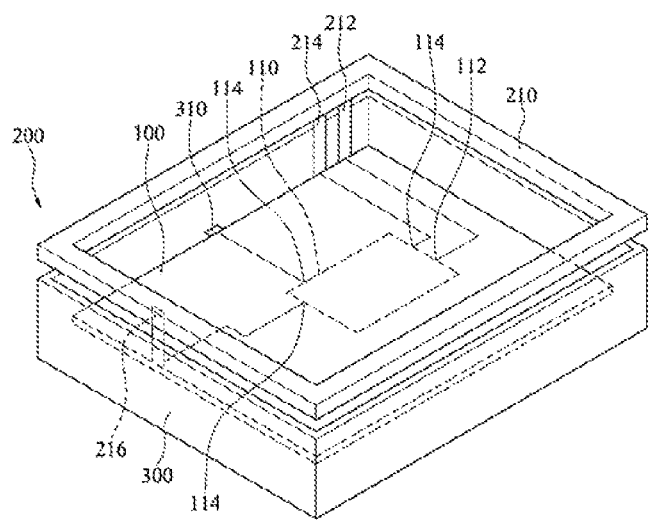
FIG. 4 is a perspective view of a circuit board and a loop antenna in an embodiment.
Figure 5:
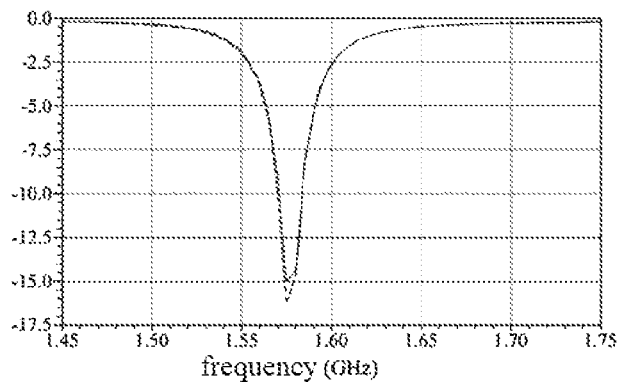
FIG. 5 is a schematic diagram showing a return loss of a circuit board and a loop antenna in an embodiment.

FIG. 4 is a perspective view of a circuit board 100 and a loop antenna 200 in an embodiment. FIG. 5 is a schematic diagram showing a return loss of a circuit board 100 and a loop antenna 200 in an embodiment. As shown in FIG. 4, the wireless communication device further includes a third short-circuit portion 310. An end of the third short-circuit portion 310 is connected to the ground terminal 114. Another end of the third short-circuit portion 310 is connected the ground loop 300. That is, the third short-circuit portion 310 is connected between the ground loop 300 and the ground terminal 114. Thus, the ground loop 300, the third short-circuit portion 310, the feed portion 212, the first short-circuit portion 214, the second short-circuit portion 216 and the conductive loop 210 form the loop antenna 200. The projection of the third short-circuit portion 310 onto the conductive loop 210 is located between the projections of the first short-circuit portion 214 and the second short-circuit portion 216 onto the conductive loop 210. Please refer to FIG. 5, compared with the operating frequency (which is represented in a dotted line in FIG. 5) in the embodiment of FIG. 2, the operating frequency (which is represented in a solid line) in the embodiment of FIG. 4 does not change. Therefore, with such a configuration, the ground loop 300 can also serve as the grounding for electro-static discharge (ESD) or electro-magnetic interference (EMI) through the third short-circuit portion 310.

Figure 6:
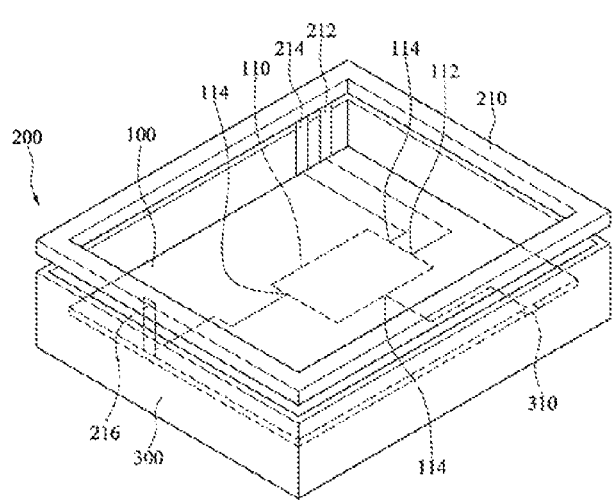
FIG. 6 is a perspective view of a circuit board and a loop antenna in an embodiment.
Figure 7:
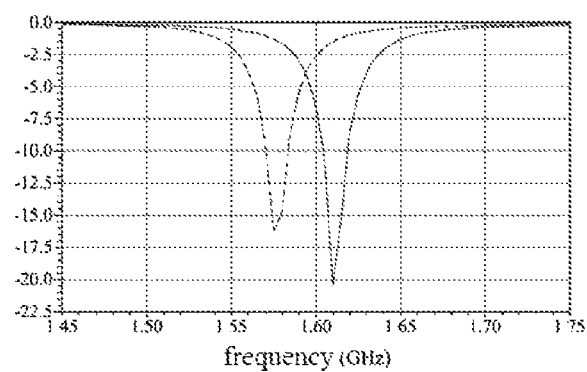
FIG. 7 is a schematic diagram showing a return loss of a circuit board and a loop antenna in an embodiment.

FIG. 6 is a perspective view of a circuit board 100 and a loop antenna 200 in an embodiment. FIG. 7 is a schematic diagram showing a return loss of the circuit board 100 and the loop antenna 200 in an embodiment. As shown in FIG. 6, the projection of the third short-circuit portion 310 onto the conductive loop 210 is located between the projections of the feed portion 212 and the second short-circuit portion 216 onto the conductive loop 210. Please refer to FIG. 7, compared with the operating frequency (which is represented in a dotted line in FIG. 7) in the embodiment of FIG. 3, the operating frequency (which is represented in a solid line) in the embodiment of FIG. 6 changes. Therefore, the current path of the loop antenna is extended by changing the position of the third short-circuit portion 310 to adjust the operating frequency.

Figure 8:
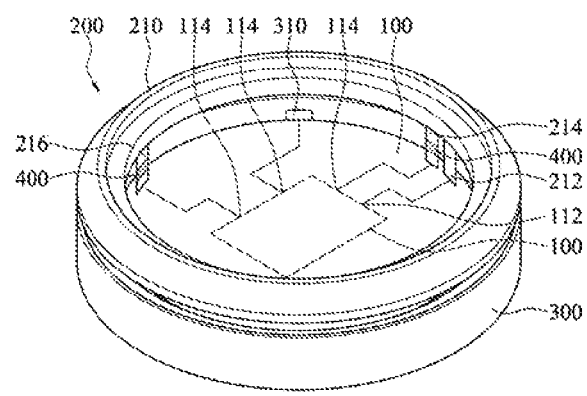
FIG. 8 is a perspective view of a circuit board and a loop antenna in an embodiment.
Figure 9:
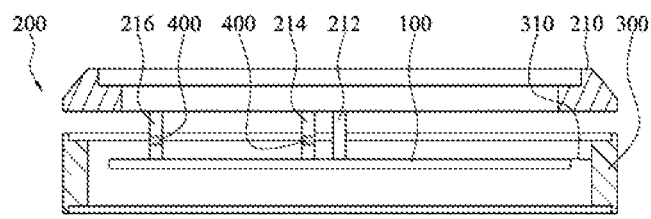
FIG. 9 is a side view of a circuit board and a loop antenna in an embodiment.

FIG. 8 is a perspective view of a circuit board 100 and a loop antenna 200 in an embodiment. FIG. 9 is a side view of a circuit board 100 and a loop antenna 200 in an embodiment. In the embodiment of FIG. 2, the conductive loop 210 of the loop antenna 200 is rectangle. In the embodiment of FIG. 8 and FIG. 9, the conductive loop 210 of the loop antenna 200 is round. In embodiments, the shape of the conductive loop 210 of the loop antenna 200 is various, which is not limited herein. In an embodiment, the shape of the conductive loop 210 of the loop antenna 200 is designed to match the casing 600.

In an embodiment, as shown in FIG. 8, the first short-circuit portion 214 or the second short-circuit portion 216 further includes at least a matching component 400 (in the embodiment, both the first short-circuit portion 214 and the second short-circuit portion 216 include the matching component 400). The matching component 400 includes one or more capacitors or inductors. Thus, the impedance matching and the operating frequency of the loop antenna 200 are adjustable.

As shown in FIG. 8 and FIG. 9, the wireless communication device further includes a round ground loop 300 (which is the conductive portion of the casing 600) and the third short-circuit portion 310. The third short-circuit portion 310 is connected between the ground terminal 114 of the circuit board 100 and the ground loop 300. In the embodiment, similarly, the projection of the third short-circuit portion 310 onto the conductive loop 210 is located between the projections of the first short-circuit portion 214 and the second short-circuit portion 216 onto the conductive loop 210. In an embodiment, the projection of the third short-circuit portion 310 onto the conductive loop 210 is located between the projections of the feed portion 212 and the second short-circuit portion 216 onto the conductive loop 210.

Figure 10:
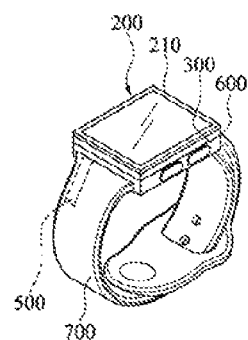
FIG. 10 is a perspective view of partial of a wireless communication device in an embodiment.
Figure 11:
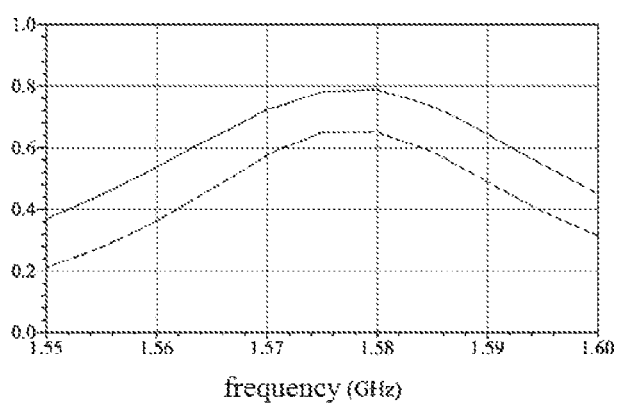
FIG. 11 is a schematic diagram showing an antenna efficiency of a circuit board and a loop antenna in an embodiment.
Figure 12:
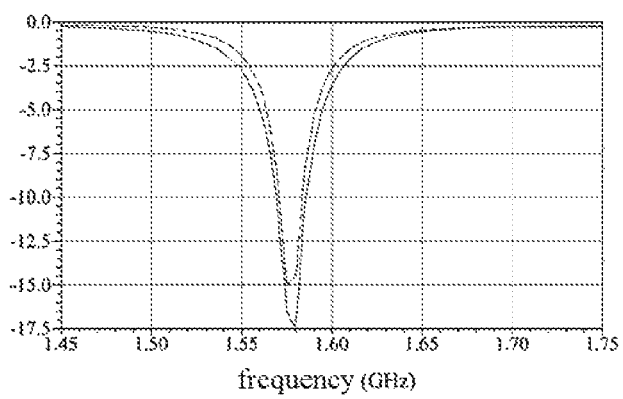
FIG. 12 is a schematic diagram showing a return loss of a circuit board and a loop antenna in an embodiment.

FIG. 10 is a perspective view of partial of a wireless communication device in an embodiment. FIG. 11 is a schematic diagram showing an antenna efficiency of a circuit board and a loop antenna in an embodiment. FIG. 12 is a schematic diagram showing a return loss of a circuit board and a loop antenna in an embodiment. Compared with the embodiments of FIG. 2, FIG. 10, the wireless communication device further includes a conductive band 500. The conductive band 500 is connected to an outer side of the ground loop 300 and extends outward. The conductive band 500 serves as an extended ground plane for the loop antenna 200 to adjust the operating frequency and the impedance of the loop antenna 200. In the embodiment, the length of the conductive band 500 is shorter than or equal to a quarter of the wavelength corresponding to the operating frequency of the loop antenna 200. The conductive band 500 is made of metal or other conductive materials. In the embodiment, the conductive band 500 is disposed inside a watch strap 700 but not touch the human body directly to avoid the signal interference due to the body.

As shown in FIG. 11 and FIG. 12, compared with the communication quality (which is represented by a dotted line) in the embodiment of FIG. 1, the antenna efficiency (which is represented by a solid line) in the embodiment of FIG. 10 is improved.

Figure 13:
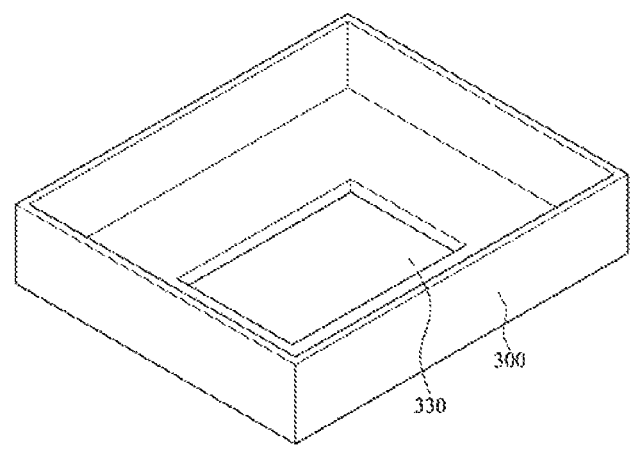
FIG. 13 is a perspective view of a ground loop in an embodiment.

FIG. 13 is a perspective view of a ground loop 300 in an embodiment. As shown in FIG. 13, in an embodiment, the ground loop 300 extends inwardly to be shaped like a plate with an opening 330 at the center. The opening 330 is formed to avoid the impact of the ground loop on the antenna signals. In an embodiment, other functional modules, such as a charging module and a heart-rate monitoring module, are configured in the opening 330, which improves the utilization efficiency of the limited space within the casing 600.

In sum, the conductive portion of the casing of the wireless communication device is used for the antenna, and the interior space of the casing is utilized greatly. Furthermore, no additional antenna is required, which reduces the cost.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A wireless communication device comprising:
   a circuit board including a wireless communication circuit, the wireless communication circuit includes a signal transmitting end and a ground terminal; and
   a loop antenna including a conductive loop, a feed portion, a first short-circuit portion and a second short-circuit portion, the feed portion is connected between the conductive loop and the signal transmitting end, and the first short-circuit portion and the second short-circuit portion are connected between the conductive loop and the ground terminal, respectively;
   a ground loop disposed around the circuit board;
   a third short-circuit portion connected between the ground loop and the ground terminal for allowing electro-static discharge (ESD) or electro-magnetic interference (EMI) to flow to the ground terminal via a shortest, low impedance path to the ground terminal;
   wherein a distance between the first short-circuit portion and the feed portion is within 0.1 times of a wavelength corresponding to an operating frequency of the loop antenna, and a distance between the second short-circuit portion and the feed portion is within 0.5 times of the wavelength corresponding to the operating frequency of the loop antenna.

2. The wireless communication device according to claim 1, wherein the first short-circuit portion or the second short-circuit portion further includes a matching component, and the matching component includes at least a capacitor or an inductor.

3. The wireless communication device according to claim 1, wherein a vertical projection of the conductive loop is located outside of the vertical projection of the circuit board.

4. The wireless communication device according to claim 1, wherein the loop antenna and the circuit board are located in different planes.

5. The wireless communication device according to claim 1, wherein the projection of the third short-circuit portion onto the conductive loop is located between the projection of the first short-circuit portion and the second short-circuit portion onto the conductive loop.

6. The wireless communication device according to claim 1, wherein the projection of the third short-circuit portion onto the conductive loop is located between the projection of the feed portion and the second short-circuit portion onto the conductive loop.

7. The wireless communication device according to claim 1, wherein the wireless communication device further includes a conductive band, and the conductive band is connected to an outer side of the ground loop and extends outward.

8. The wireless communication device according to claim 7, wherein a length of the conductive band is shorter or equal to a quarter of the wavelength corresponding to the operating frequency of the loop antenna.

* * * * *